United States Patent
Badros et al.

(10) Patent No.: US 8,577,181 B1
(45) Date of Patent: Nov. 5, 2013

(54) DETERMINING CONTENT TO BE DISPLAYED

(75) Inventors: Gregory Joseph Badros, Palo Alto, CA (US); Matthew I. Lloyd, San Francisco, CA (US)

(73) Assignee: Google Inc., Mountain View, CA (US)

( * ) Notice: Subject to any disclaimer, the term of this patent is extended or adjusted under 35 U.S.C. 154(b) by 24 days.

(21) Appl. No.: 13/250,015

(22) Filed: Sep. 30, 2011

Related U.S. Application Data

(63) Continuation of application No. 11/756,132, filed on May 31, 2007, now abandoned.

(51) Int. Cl.
*G06K 9/32* (2006.01)
*G06Q 30/00* (2012.01)

(52) U.S. Cl.
USPC ........... 382/298; 382/206; 382/286; 382/295; 382/301; 345/660; 705/14.4; 705/14.49; 705/14.73

(58) Field of Classification Search
USPC .......... 382/298, 206, 286, 295, 301; 345/660; 705/14.4, 14.49, 14.73
See application file for complete search history.

(56) References Cited

U.S. PATENT DOCUMENTS

| | | | |
|---|---|---|---|
| 5,724,521 A | 3/1998 | Dedrick | |
| 5,740,549 A | 4/1998 | Reilly et al. | |
| 5,848,397 A | 12/1998 | Marsh et al. | |
| 5,948,061 A | 9/1999 | Merriman | |
| 6,026,368 A | 2/2000 | Brown et al. | |
| 6,044,376 A | 3/2000 | Kurtzman | |
| 6,078,914 A | 6/2000 | Redfern | |
| 6,144,944 A | 11/2000 | Kurtzman, II et al. | |
| 6,167,382 A | 12/2000 | Sparks et al. | |
| 6,185,589 B1 * | 2/2001 | Votipka | 715/206 |
| 6,269,361 B1 | 7/2001 | Davis et al. | |
| 6,401,075 B1 | 6/2002 | Mason et al. | |
| 6,985,882 B1 | 1/2006 | Del Sesto | |
| 7,039,599 B2 | 5/2006 | Merriman | |
| 7,136,875 B2 | 11/2006 | Anderson et al. | |
| 7,315,983 B2 * | 1/2008 | Evans et al. | 715/713 |

(Continued)

FOREIGN PATENT DOCUMENTS

WO    WO97/21183    6/1997

OTHER PUBLICATIONS

U.S. Appl. No. 95/001,071, filed Sep. 30, 2004, Reexamination of Stone et al.

(Continued)

*Primary Examiner* — Michael A Newman
(74) *Attorney, Agent, or Firm* — Fish & Richardson P.C.

(57) ABSTRACT

A computer-implemented method for determining content to be displayed includes determining a first size aspect of first content that is to be presented in a graphical user interface. The method includes obtaining second content and causing the second content to be presented in the graphical user interface with the first content, wherein the second content has a second size aspect with a predefined relationship to the first size aspect. A system includes a size determining module determining a first size aspect of first content that is to be presented in a graphical user interface. The system includes a content module obtaining second content based on the first size aspect, the second content having a second size aspect with a predefined relationship to the first size aspect. The system includes a page generating module causing the second content to be presented in the graphical user interface with the first content.

28 Claims, 7 Drawing Sheets

(56) References Cited

U.S. PATENT DOCUMENTS

| | | | | |
|---|---|---|---|---|
| 7,765,470 | B2* | 7/2010 | Epstein | 715/243 |
| 8,302,029 | B2* | 10/2012 | Makela | 715/800 |
| 2003/0128234 | A1* | 7/2003 | Brown et al. | 345/744 |
| 2004/0075671 | A1* | 4/2004 | Vale et al. | 345/660 |
| 2006/0111971 | A1* | 5/2006 | Salesin et al. | 705/14 |
| 2006/0206380 | A1* | 9/2006 | Joo | 705/14 |
| 2007/0089053 | A1 | 4/2007 | Uhlig et al. | |

OTHER PUBLICATIONS

U.S. Appl. No. 95/001,061, filed Sep. 3, 2002, Reexamination of Stone et al.

U.S. Appl. No. 95/001,069, filed Jul. 11, 2002, Reexamination of Dean et al.

U.S. Appl. No. 95/001,068, filed Dec. 7, 2002, Reexamination of Stone et al.

AdForce, Inc., A complete Guide to AdForce, Version 2.6, 1998, 285 pages.

AdForce, Inc., S-1/A SEC Filing, May 6, 1999, 9 pages.

AdKnowledge Campaign Manager: Reviewer's Guide, AdKnowledge, Aug. 1998, 23 pages.

AdKnowledge Market Match Planner: Reviewer's Guide, AdKnowledge, May 1998, 26 pages.

'Auto-Resize a Web-site' [online], Bytes, Sep. 2007, [retrieved on Jul. 2, 2009]. Retrieved from the Internet: URL <http://bytes.com/topic/javascript/answers/713497-auto-resize-web-site>. 6 pages.

Ad-Star.com website archive from www.Archive.org, Apr. 12, 1997 and Feb. 1, 1997, 43 pages.

Baseview Products Inc., AdManagerPro Administration Manual v. 2.0, Dec. 1998, 226 pages.

Baseview Products Inc., ClassManagerPro Administration Manual v. 1.0.5, Feb. 1, 1997, 157 pages.

Business Wire, "Global Network, Inc. Enters Into Agreement in Principle With Major Advertising Agency," Oct. 4, 1999, 2 pages.

Dedrick. "A Consumption Model for Targeted Electronic Advertising, Intel Architecture Labs," IEEE, 1995, 9 pages.

Dedrick. "Interactive Electronic Advertising," IEEE, 1994, 12 pages.

Information Access Technologies, Inc., Aaddzz brochure, "The Best Way to Buy and Sell Web Advertising Space," 1997, 6 pages.

Information Access Technologies, Inc., Aaddzz.com website archive from www.Archive.org, archived on Jan. 30, 1998, 42 pages.

Request for Reexamination of U.S. Patent No. 6,446,045 B1—issued Sep. 3, 2002, Control No. 95/001,061, request filed Jul. 7, 2008, 54 pages.

Request for Reexamination of U.S. Patent No. 6,829,587 B2—issued Dec. 7, 2004, Control No. 95/001,068, request filed Jul. 14, 2008, 85 pages.

Request for Reexamination of U.S. Patent No. 7,240,025 B2—issued Jul. 3, 2007, Control No. 95/001,073, request filed Jul. 30, 2008, 85 pages.

Request for Reexamination of U.S. Patent No. 7,249,059 B2—issued Jul. 24, 2007, Control No. 95/001,069, request filed Jul. 21, 2008, 81 pages.

'Resizing a website' [online], HTML Help Central, Jun. 2003, [retrieved on Jul. 2, 2009]. Retrieved from the Internet: URL <http://www.htmlhelpcentral.com/messageboard/showthread.php?t=7260>. 7 pages.

'Resizing Flash Banner in Fluid Website' [online], Flash Kit Community Forums, 2007, [retrieved on Jul. 2, 2009]. Retrieved from the Internet: URL <http://board.flashkit.com/board/archive/index.php/t-725977.html>. 2 pages.

'Webproworld' [online], Twello, Mar. 2008, [retrieved on Jul. 2, 2009]. Retrieved from the Internet: URL <http://www.webproworld.com/submit-your-site-review/67584-resize-website.html>. 18 pages.

Zeff et al. Advertising on the Internet, $2^{nd}$ Ed., John Wiley & Sons, 1999, 440 pages.

* cited by examiner

DETERMINING CONTENT TO BE DISPLAYED

CROSS-REFERENCE TO RELATED APPLICATIONS

This application is a continuation application of and claims priority to U.S. application Ser. No. 11/756,132, filed on May 31, 2007, the entire contents of which are incorporated herein by reference.

TECHNICAL FIELD

This document relates to determining content.

BACKGROUND

In the online environment advertising has taken on a substantial presence with the vast increase in the use of that medium that was fueled by the so-called Internet revolution. One example of online advertising is that an advertisement is displayed as an identifiable portion or area on the screen, for example in form of a banner or a box. The advertising content can be displayed on a screen where there is also other content.

The increase in use of computer-based devices and the increasing prevalence of advertisements in such fields have also brought some opportunities for tracking and evaluating advertisement efforts. For example, ads that are published online are sometimes created with one or more hyperlinks that the viewer can click on to get more information or to purchase the offered goods or services. Because this action by the user is performed in a controlled (e.g., a digital processor-based) environment, the user's act of clicking can be detected if so desired and the fact that the user clicked can later be used for one or more purposes, such as to measure whether the ad generates sufficient interest among the public or to determine the price that should be paid for publishing it.

SUMMARY

The invention relates to determining content.

In a first aspect, a computer-implemented method for determining content to be displayed includes determining a first size aspect of first content that is to be presented in a graphical user interface. The method includes obtaining second content. The method includes causing the second content to be presented in the graphical user interface with the first content, wherein the second content has a second size aspect with a predefined relationship to the first size aspect.

Implementations can include any, all or none of the following features. The second content can have a flexible size when obtained, and the method can further include adjusting the second content based on the first size aspect so that the second size aspect has the predefined relationship to the first size aspect. Adjusting the second content can include at least one action selected from: changing a font size; changing a text layout; scaling or cropping an image; selecting one among multiple alternative versions of the second content based on the first size aspect; and combinations thereof. The second content can be obtained so that the second size aspect has the predefined relationship to the first size aspect. The second content can be of a type that is to be provided in the graphical user interface in an amount so that the second size aspect approximately matches the first size aspect. At least the first size aspect can be a height, and the first size aspect can reflect a vertical height of the first content when the first content is presented in the graphical user interface. At least the first size aspect can be a width, and the first size aspect can reflect a horizontal width of the first content when the first content is presented in the graphical user interface. Determining the first size aspect can include determining a first height and width, and the second content can be obtained to have a second height and width that have the predefined relationship to the first height and width. The second content can be a rectangular advertisement block positioned inside the first content. The second content can be obtained so that it matches an identified region of the graphical user interface. The second content can be obtained to have a shape selected from the group consisting of square, rectangular, diamond-shape, circular, oval, and combinations thereof. Determining the first size aspect can include estimating an aspect that the first content would have if the first content were presented in the graphical user interface. Determining the first size aspect can include determining an aspect that the first content has when the first content is presented in the graphical user interface. The aspect of the first content can be measured at a device on which the first content is presented in the graphical user interface. The second content can include advertisements in multiple units. The multiple units can have individual predefined sizes that are taken into account in obtaining the second content so that it has the second size aspect. The first content while being presented can have an actual first size aspect different from the determined first size aspect, and the method can further include setting an actual second size aspect of the second content so that the set actual second size aspect has the predefined relationship to the actual first size aspect. The actual first size aspect can result from a dynamic resizing of the first content in the graphical user interface. Setting the actual second size aspect can include causing more content items to be presented in the graphical user interface together with the second content.

In a second aspect, a computer program product is tangibly embodied in an information carrier and includes instructions that when executed by a processor perform a method for registering an event. The method includes determining a first size aspect of first content that is to be presented in a graphical user interface. The method includes obtaining second content. The method includes causing the second content to be presented in the graphical user interface with the first content, wherein the second content has a second size aspect with a predefined relationship to the first size aspect.

In a third aspect, a system includes a size determining module determining a first size aspect of first content that is to be presented in a graphical user interface. The system includes a content module obtaining second content based on the first size aspect, the second content having a second size aspect with a predefined relationship to the first size aspect. The system includes a page generating module causing the second content to be presented in the graphical user interface with the first content.

Implementations can include any, all or none of the following features. The second content can be of a type that is to be provided in the graphical user interface in an amount so that the second size aspect approximately matches the first size aspect. The size determining module can estimate an aspect that the first content would have if the first content were presented in the graphical user interface. The size determining module can determine an aspect that the first content has when the first content is presented in the graphical user interface. The aspect of the first content can be measured at a device on which the first content is presented in the graphical user interface. The second content can include advertisements in multiple units. The multiple units can have predefined sizes that are taken into account in obtaining the second content so that it has the second size aspect.

The details of one or more embodiments are set forth in the accompanying drawings and the description below. Other features and advantages will be apparent from the description and drawings, and from the claims.

DESCRIPTION OF DRAWINGS

Like reference symbols in the various drawings indicate like elements.

DETAILED DESCRIPTION

Figure 1:
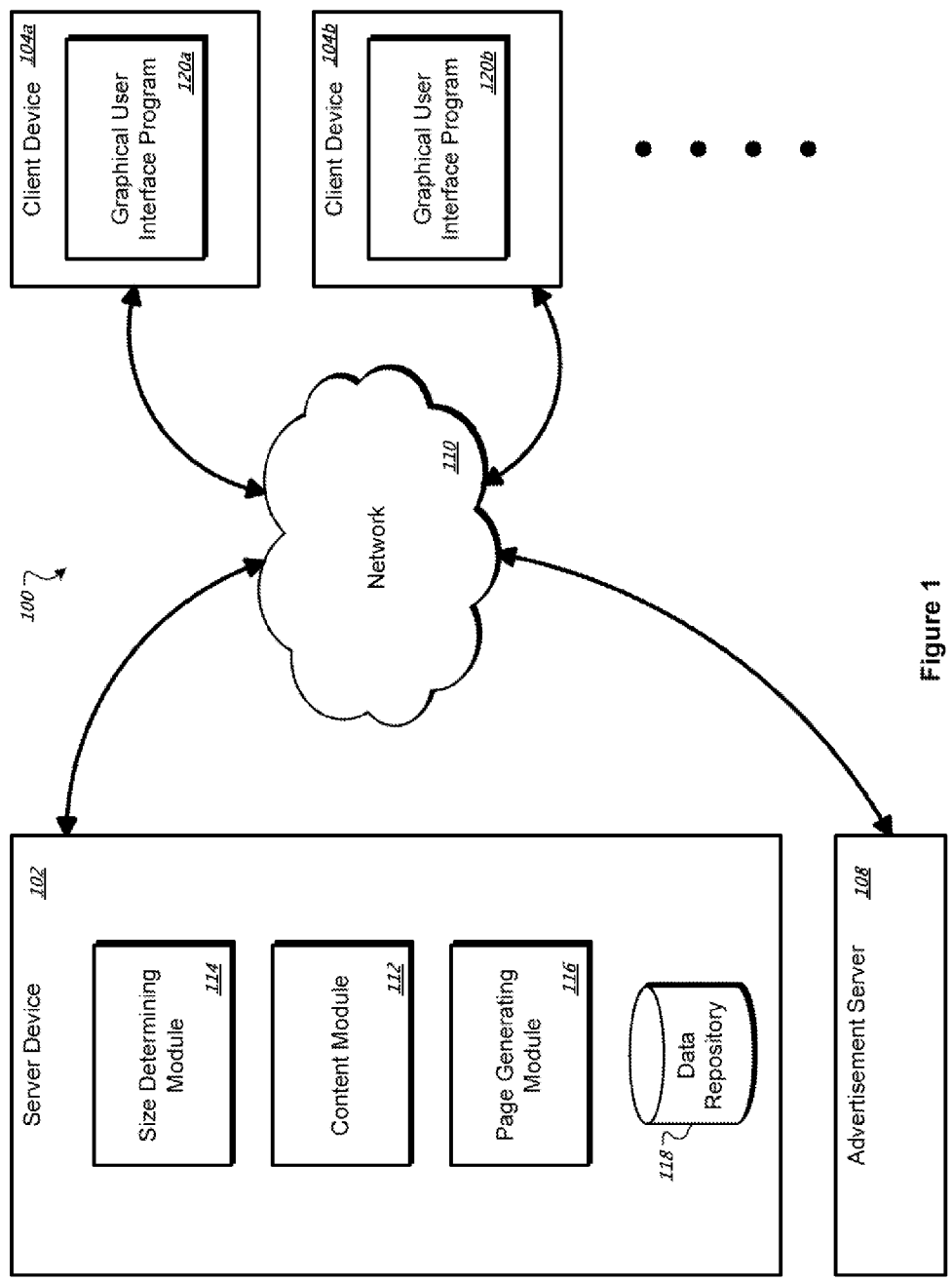
FIG. 1 is an example of a system for generating and/or displaying page content and advertisements.

FIG. 1 shows a system 100 that includes a server device 102, one or more client devices 104a-b, an advertisement server 108, and a network 110. The server device 102, client device 104a-b, and advertisement server 108, in this example, are connected to each other by the network 110. The network 110 can, for example, be a local area network (LAN), a wide area network (WAN), the Internet, or any other form of network. For example, it will be described below that the system 100 can be used for generating advertisement-based pages for display. Other architectures can be used, including some that do not have a client-server configuration. Further, system 100 can be used to produce other forms of content; that is, forms other than advertisement-based pages.

The server device 102, in this example, contains a content module 112, a size determining module 114, a page generating module 116 and a data repository 118. The content module 112 can obtain the content of the page to be displayed from the data repository 118. The content of the page can contain a forum thread, a conversation, a discussion, a news article, or some other content, to name just a few examples. The data repository 118 can hold content or information regarding pages that can be requested by the client devices 104a-b. The size determining module 114 can estimate the size of the page that is to be displayed on the client device 104a-b. This size estimate of the page can, for example, take into account the amount of content in the page, the resolution of the user's screen, or any other estimation approach. The page generating module 116 can create the page which may contain the content retrieved by the content module 112. The page generating module 116 can also request advertisements from the advertisement server 108 to be displayed on the page. These advertisements can be sent from the advertisement server 108 to the server device 102 and then forwarded to the client device 104a-b. The advertisements can also be sent directly to the client device 104a-b, as another example.

The client devices 104a-b contain a graphical user interface program 120a-b respectively that can, for example, display content retrieved from the server device 102 through the network 110. The content can be requested by the client device 104a from the server device 102 to be displayed on that client device 104a. In another implementation the content can be requested by the client device 104a from the server device 102 to be displayed on a different client device 104b. The graphical user interface program 120a-b can display content, such as a web page, created or compiled by the page generating module 116. For example the graphical user interface 120a-b can be a web browser used to display the requested content. As another example, the graphical user interface program 120a and 120b can display advertisements that are retrieved from the advertisement server 108. Examples below will show that a size aspect of advertisements can be caused to match or otherwise relate to a size aspect of the page content when the advertisements are presented in the graphical user interface 120a-b with the page content.

The advertisement server 108 can hold a variety of advertisements to be displayed on pages. The advertisement server 108 can, for example, run on the same hardware as the server device 102 or on different hardware. The advertisements requested by the server device 102 can relate to the content requested by the client device 104a-b, or have no relation.

Figure 2:
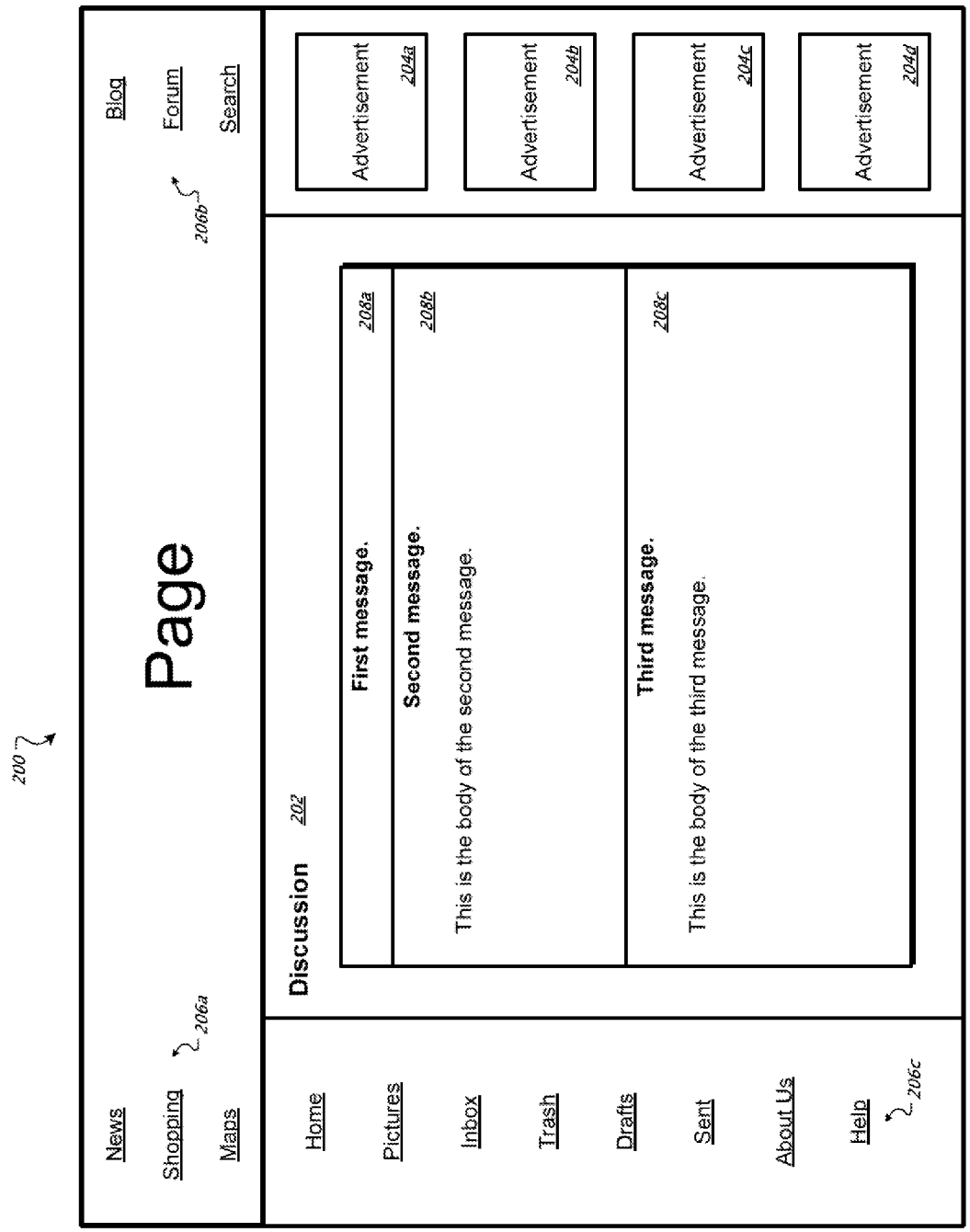
FIG. 2 is an example of a generated page.

FIG. 2 shows an example of a page 200. An estimation can be performed for the page 200, before or after the page 200 is generated. The estimation can, for example, be a size estimate of the page 200 or an estimate of the size of the content of the page 200, among others. The page 200 can be created, for example, by the server device 102. The page 200 here contains a discussion 202, advertisements 204a-d, and links 206a-c. Any of the content of the page 200 can be dynamic or static content. The links 206a-c can allow navigation to other pages within the site, pages on a different site, a combination of the two, and/or provide other functions. In one example the links 206a can navigate to news, shopping, and maps. The links 206b can navigate to a blog, a forum, or a search feature. The links 206c can navigate to the home page, pictures, e-mail options, help support, etc. In one implementation the page 200 can be presented when a user logs into a Gmail account provided by Google Inc. In this implementation the links can allow navigation of email and other Google features offered by a Gmail server.

In the current example the main content of the page 200 is the discussion 202. The discussion 202 can have a first size aspect. For example, the first size aspect can be the height of the discussion 202, the width of the discussion 202, or an estimate of the height of the discussion 202. The first size aspect can also be some other aspect or combination of aspects of the discussion 202. The discussion 202 can, for example, contain any number of messages 208a-c. The three messages 208a-c in this example have dynamic sizes and can assume a collapsed state, as is the first message 208a, or an expanded state, as are the second and third messages 208b and 208c, respectively. Changing the size of the messages 208a-c can change the content displayed in the graphical user interface program 120a-b by requesting new or additional content from the server device 102. As another example, changing the size of the messages 208a-c can change the amount of the content displayed. This change in size can cause more or less so-called "whitespace" to appear on the page 200. In another example messages 208a-c in the discussion 202 can have static sizes and remain unchanged throughout display.

Advertisements or other content can be also displayed on the page 200. In this example the advertisements 204a-d appear to the right of the discussion 202. The number of advertisements, four in this example, can be based on the size of the page 200. In some examples, the size of each of the advertisements 204a-d can be based on the content of the page 200, or the amount of "whitespace" on the page 200. The amount of advertising content can be selected so that the one or more advertisements approximately match the first size aspect when presented in the graphical user interface 120a-b.

For example when the content, the discussion 202 in this example, is initially displayed a determined number of advertisements can be displayed on the page 200. The advertisements 204a-d can, for example, have certain fixed sizes, flexible sizes, or a combination of the two. If an advertisement has a flexible size, the advertisement can be adjusted based on the first size aspect in order to create a relationship between the first and second size aspect. For example, the font size or text layout of the advertisement can be adjusted. As another example the advertisement can be scaled or cropped to adjust the second size aspect. Multiple versions of an advertisement, such as advertisement 204a, can exist such that one is selected based on the first size aspect. Combinations of these adjustments can also be used to create a relationship between the first and second size aspect. If the advertisement has a fixed size the advertisement can be obtained so that the size aspect of the advertisement has a predefined relationship with the first size aspect. If the size of the discussion 202 changes, for example when the first message 208a is expanded, the size or number of the advertisements 204a-d can be adjusted to reflect the new size of the page 200. For example, the size of the advertisements 204a-d can be adjusted by selecting an alternate version of the individual advertisements 204a-d. As another example the size of the advertisements 204a-d and the number of advertisements can both change when the content of the page 200 changes. The number of advertisements and/or the size(s) of advertisements can be determined based on a size aspect of the content displayed in the graphical user interface program 120a-b. For example, if a size aspect (e.g., height) of the main content of the page changes while it is being displayed, a size aspect of the advertising content can be changed in response. Moreover, the subjects of the advertisements 204a-d can be selected based on the content of the page 200, chosen by the designer of the page 200, or decided by some other approach such as a random selection, to name a few examples.

Figure 3:
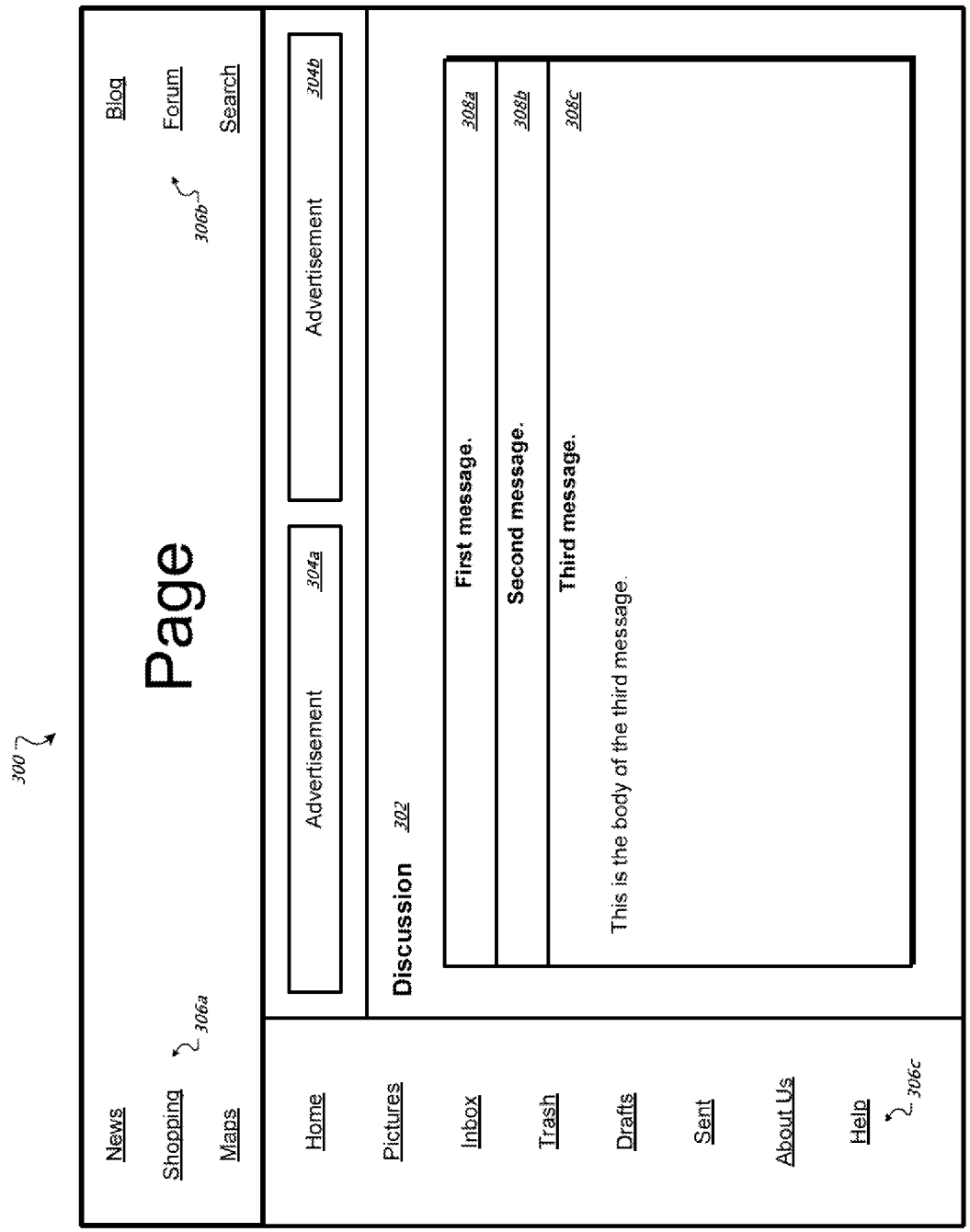
FIG. 3 is another example of a generated page.

FIG. 3 shows an example of a page 300, for which an estimation can be performed before or after the page 300 is generated. The page 300 can be created, for example, by the server device 102. The page 300 here contains a discussion 302, advertisements 304a-b, and links 306a-c. Any of the content of the page 300 can be dynamic or static content. The links 306a-c can allow navigation to other pages within the site, pages on a different site, a combination of the two, and/or provide other functions. Some examples of the functionality for the links 306a-c can be the same as listed above for links 206a-c.

In the current example the main content of the page 300 is the discussion 302. The discussion 302 can, for example, contain any number of messages 308a-c. The three messages 308a-c in this example have dynamic sizes and can assume a collapsed state, as are the first and second messages 308a-b, or an expanded state, as is the third message 308c. Changing the size of the messages 308a-c can change the content displayed in the graphical user interface program 120a-b by requesting new or additional content from the server device 102. Changing the size of the messages 308a-c can also change the amount of the content displayed. This change in size can cause more or less "whitespace" to appear on the page 300. In another example messages 308a-c in the discussion 302 can have static sizes and remain unchanged throughout display. The discussion 302 can have a first size aspect. The first size aspect can, for example, be the height of the discussion 302, an estimate of the height of the discussion 302, or the width of the discussion 302. As another example the first size aspect can be the height and width of the discussion 302, a different property of the discussion 302, or a combination of properties of the discussion 302.

Advertisements or other content can also be displayed on the page 300. In this example the advertisements 304a-b appear directly above the discussion 302. In other examples the advertisements 304a-b could appear below the discussion 302, to the left of the discussion 302, or in some other location on the page 300. The number of advertisements, two in this example, can be based on the size of the page 300. As other examples the size of each of the advertisements 304a-b can be based on the content of the page 300, or the amount of "whitespace" on the page 300. The number of advertisements and/or the size(s) of advertisements can be a result of a size aspect of the content displayed in the graphical user interface program 120a-b. For example when the content, the discussion 302 in this example, is initially displayed a determined number of advertisements can be displayed on the page 300. The advertisements 304a-b displayed on the page 300 can have fixed or flexible sizes, or a combination of the two. For example, if an advertisement, such as advertisement 304a, has a fixed size, the advertisement 304a can be obtained such that a size aspect of the advertisement 304a has a predefined relationship with the first size aspect. If an advertisement has a flexible size, such as advertisement 304b in this example, the size of the advertisement 304b can be adjusted in order to coincide with a predefined relationship between the size of the advertisement 304b and the first size aspect. The adjustment can be a change in font size, a change in text layout, or scaling or cropping of the advertisement 304b, to name a few examples. If the size of the discussion 302 changes, for example when the first message 308a is expanded, the size or number of the advertisements 304a-b can be adjusted to reflect the new size of the page 300. As another example the size of the advertisements 304a-b and the number of advertisements can both change when the content of the page 300 changes. The subjects of the advertisements 304a-b can be selected based on the content of the page 300, chosen by the designer of the page 300, or decided by some other approach such as a random selection, to name a few examples.

Figure 4:
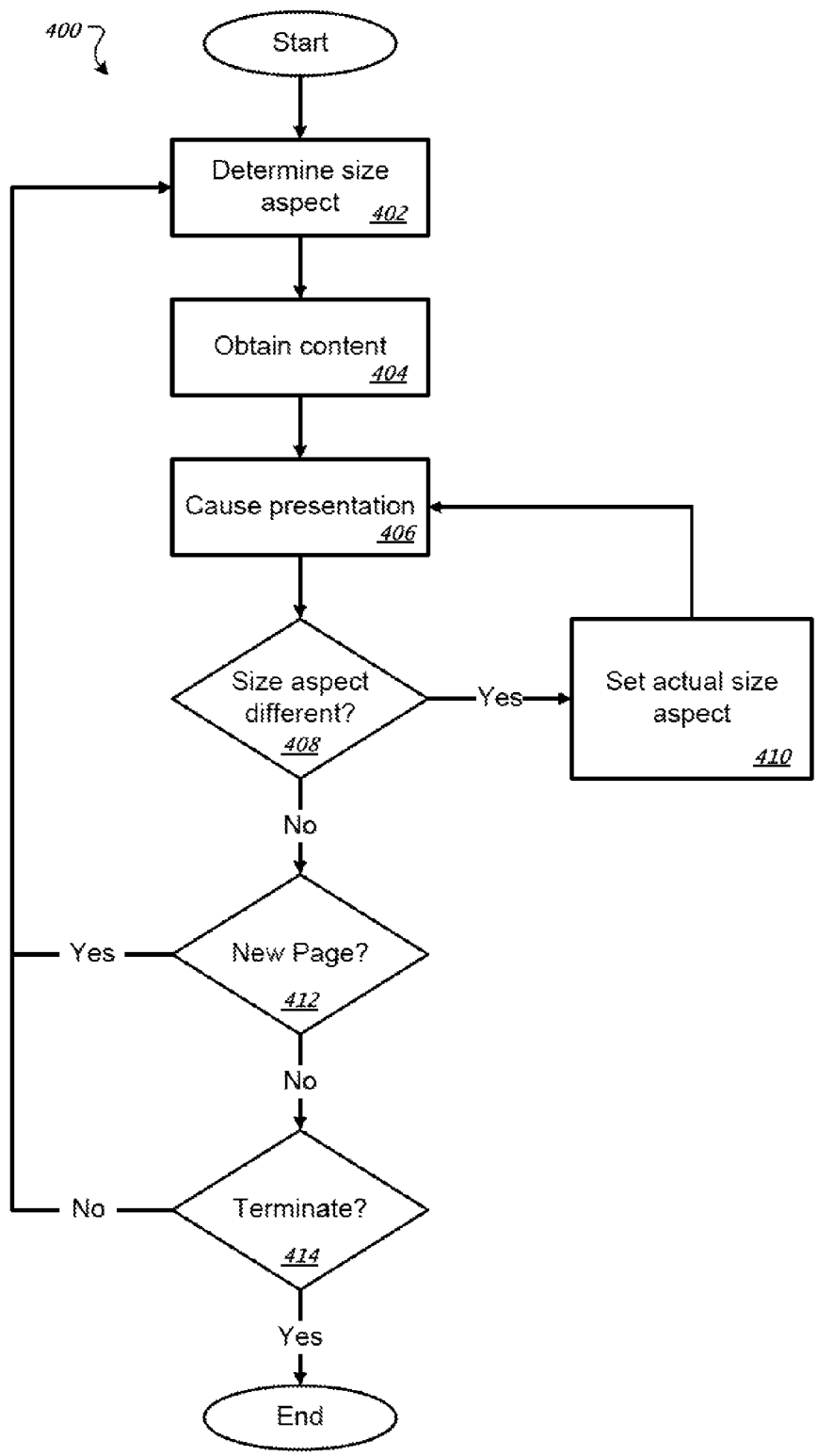
FIG. 4 is a flow chart of example steps that can be performed to display page content.

FIG. 4 is an example of a flow chart which shows a process 400 that can be performed to display a page. The process 400 can be performed by a processor reading executable instructions, for example in the system 100. The system 100 and parts thereof will be referred to in the following as examples.

In step 402 there is determined a first size aspect of first content that is to be presented in a graphical user interface. For example the server device 102 can determine the first size aspect of the first content with the size determining module 114. The content can, for example, be a conversation in a Gmail account, or some other content. In some implementations, the size aspect can be determined by another component. For example, executable code on a client device (such as a Javascript portion) can be configured to measure the size aspect (e.g., a height) of the rendered page and report it such that the advertisement can be selected based thereon. For example, such information can be forwarded to the server device 102 or the advertisement server 108.

At step 404 second content is obtained based on the first content. The second content can, for example, have a second size aspect with a predefined relationship to the first size aspect. In another example the second content can have a flexible size when obtained. For example the content module 112 can obtain the second content from the data repository 118 and the second content can include one or more advertisements. In step 406 the second content is presented with the first content in the graphical user interface. For example, the server device 102 can cause presentation of the second content on the client device 104*a-b*. The presentation can, for example, take place in the graphical user interface program 120*a-b*, or in some other program on the client device 104*a-b*. At step 408 if the first content while being presented has an actual first size aspect different from the determined first size aspect, then at step 410 the actual second size aspect of the second content is set so that the adjusted second size aspect has the predefined relationship with the actual first size aspect. The actual first size aspect can, for example, be different from the first size aspect because of a dynamic resizing of the page. At step 408 if the second content has a flexible size and the size aspect of the second content does not match the predefined relationship with the first size aspect, the second content can be adjusted. The adjustment of the second content can be a change in the font size, a change in text layout, or a scaling or cropping of the second content. The adjustment can also be a selection of an alternate version of the second content, combinations of the adjustments mentioned, or some other adjustment.

At step 412 if a new page is requested the steps can be started over for the new content. For example the client device 104*a-b* can request new content from the server device 102. The server device 102 can then start the steps over for the new content that was requested. In step 414 if the process is not terminated the steps can be started over. If the process is however terminated at step 414 then the steps are no longer executed. For example, if the connection between the server device 102 and the client device 104*a-b* is terminated then the server device 102 ends the process. When, for example, the graphical user interface program 120*a-b* is closed the connection between the client device 104*ab* and the server device 102 can be terminated. If the connection is not terminated, for example, the server device 102 can start the steps once more.

Figure 5:
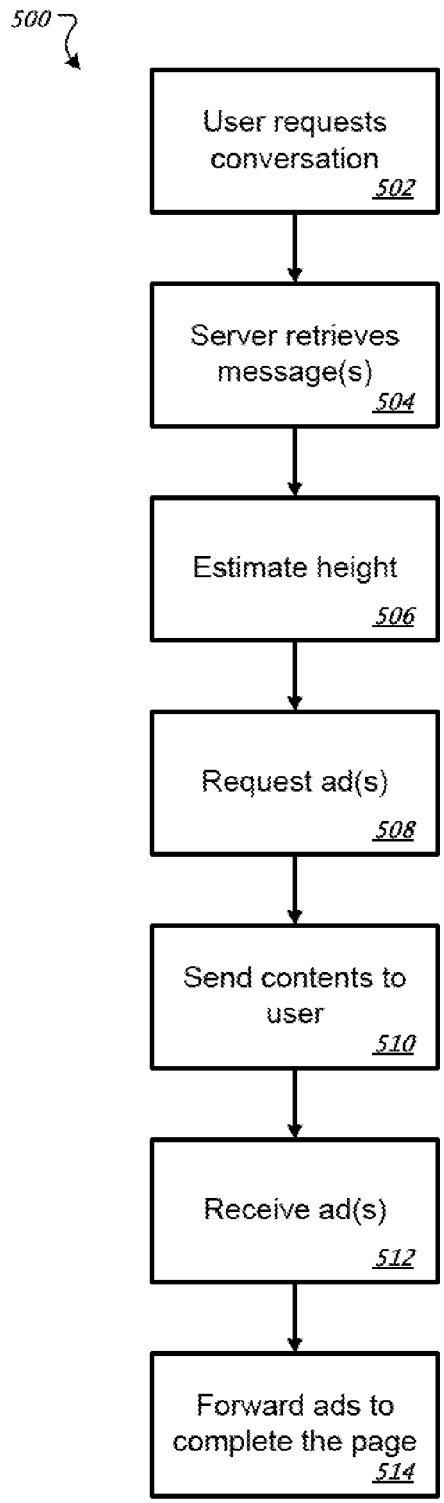
FIG. 5 is another example of steps that can be performed to display page content.

FIG. 5 is another example of a flow chart of steps that can be performed to display a page. In step 502 a conversation, or some other content, is requested. For example the client device 104*a-b* can request the conversation. At 504 a server retrieves the requested content, such as the message(s) of a conversation. For example the server device 102 can retrieve the requested content. The content can, for example, be retrieved from the data repository 118 or from some other location. An estimate of the height of the page (or a portion thereof) which will display the requested content is made at 506. For example, the estimate is a vertical height of the page when the page is presented in the graphical user interface. As another example, the size estimate can be the width of the page instead of the height, or a combination of the two. For instance, the estimate can reflect a horizontal width of the page (or a portion thereof) when presented in the graphical user interface. In this implementation, the size determining module 114 can make the size estimate.

In step 508 advertisements or other content items are requested. For example, the server device 102 can request the advertisements. The advertisements can, for example, be related to the content displayed, or the advertisements can be selected by some other method, such as those discussed above. At 510 the content is sent to the user. For example, the user can be operating the client device 104*a-b*. Continuing the example, the content can then be presented in the graphical user interface program 120*a-b*, or some other appropriate program. The advertisements are received at 512 and forwarded to complete the page at 514. If the advertisements were received, for example, by the server device 102 they can be forwarded to the client device 104*a-b* for presentation. As another example, if the advertisements were received by the client device 104*a-b* then they are presented with the requested content.

Figure 6:
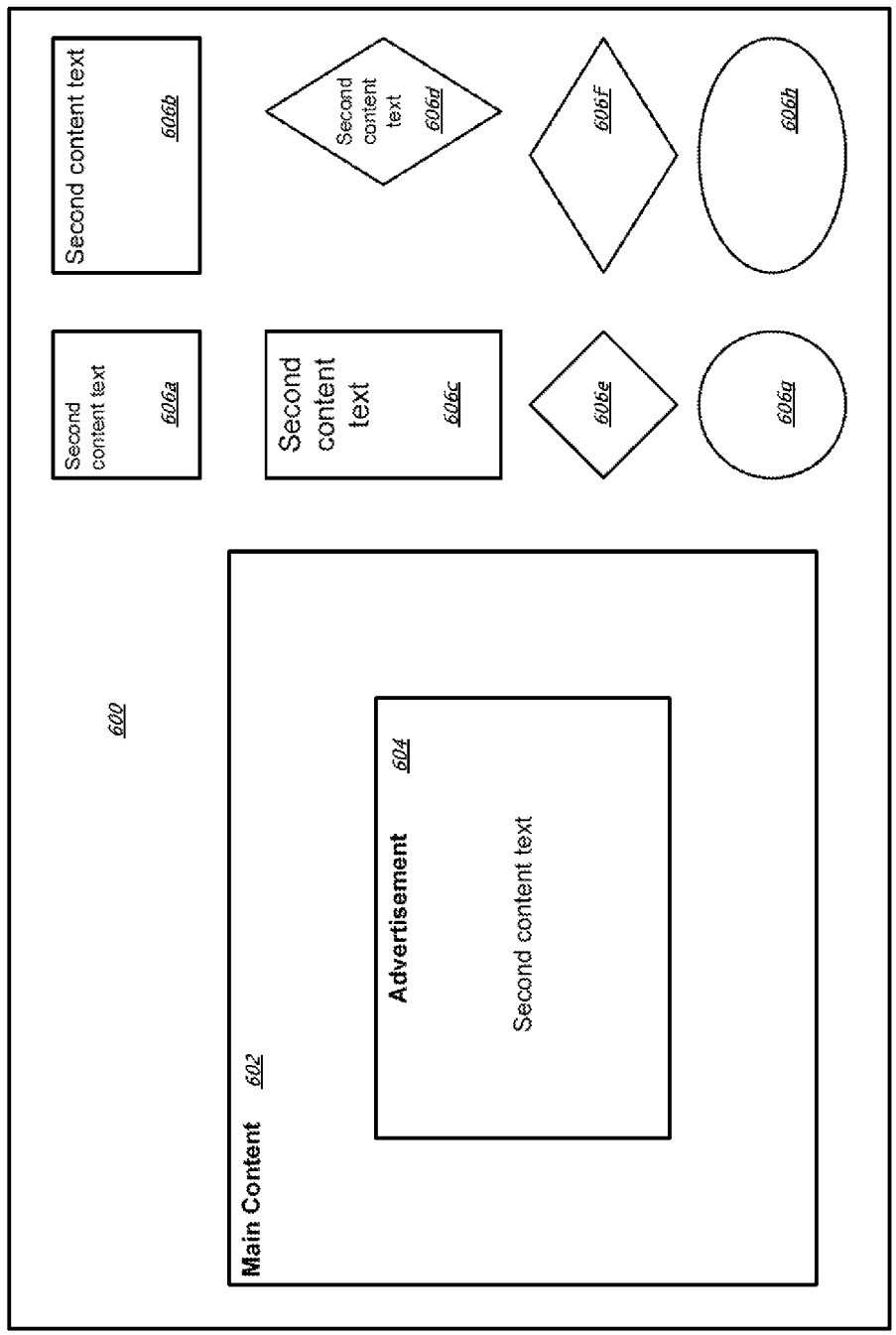
FIG. 6 shows examples of content being displayed.

FIG. 6 shows some examples of content being displayed in a graphical user interface 600. For example a main content 602 is to be presented in the graphical user interface. The main content 602 can have a first height and width that can be determined by actual measurement of the rendered content or by estimating the size before rendering, to name two examples. Here, it may be intended to place additional content, such as an advertisement, within the boundaries of the main content. A second content 604 can therefore be retrieved, for placement inside the main content 602. The second content 604 can be rectangular. In some implementations, the second content 604 can be retrieved so that it fits within the main content according to a criterion, for example that the second content not be too small, or too big, compared to the size of the main content. The advertisement 604 can have, for example, a second height and width selected based on a predefined relationship with the first height and width of the main content 602. In another example the advertisement 604 can have a flexible size when obtained. The flexible size can allow one or more adjustments of the second content 604 so that the size of the second content 604 corresponds to a predefined relationship with the size of the main content 602. The present example shows that the second content can be obtained and/or adjusted so that it matches an identified region of the graphical user interface.

The second content can have any shape. In some examples any or all of a second content 606*a-h* can be retrieved. For example, the second content can have the shape of a square (606*a*), rectangle (606*b*, 606*c*), diamond-shape (606*d*, 606*e*), circular (606*g*), or oval (606*h*). In other implementations, the second content 606*a-h* can have some other shape or combinations of shapes. Accordingly, this is another example of the second content being obtained so that it matches an identified region of the graphical user interface.

For example, when the second content 604 is obtained from a server, alternate versions of the content can be retrieved at the same time. The alternate versions can be different sizes or shapes, or contain alternate wordings of an advertisement, among other variations. The versions can have different content such as different text or images, to name a few examples. For example, a specific version of the second content 604, such as content 606*b*, can be selected from the alternate versions. The second content 604 can be adjusted if it does not coincide with the predefined relationship to the size of the main content 602. Continuing the example, the adjustment can be a change in font size to content 606*b*, or selection of an alternate version, such as content 606*a* with smaller text or content 606*c* with larger text. In another example, the adjustment can be a selection of content 606*d* that has a different shape and font size but still contains the same text as content 606*b*. The adjustment can, for example, be a change in text layout such as the row of text in content 606*b* and the column of text in content 606*c*. As other examples the adjustment can be scaling or cropping of an image, combinations of the mentioned adjustments, or some other adjustment.

Figure 7:
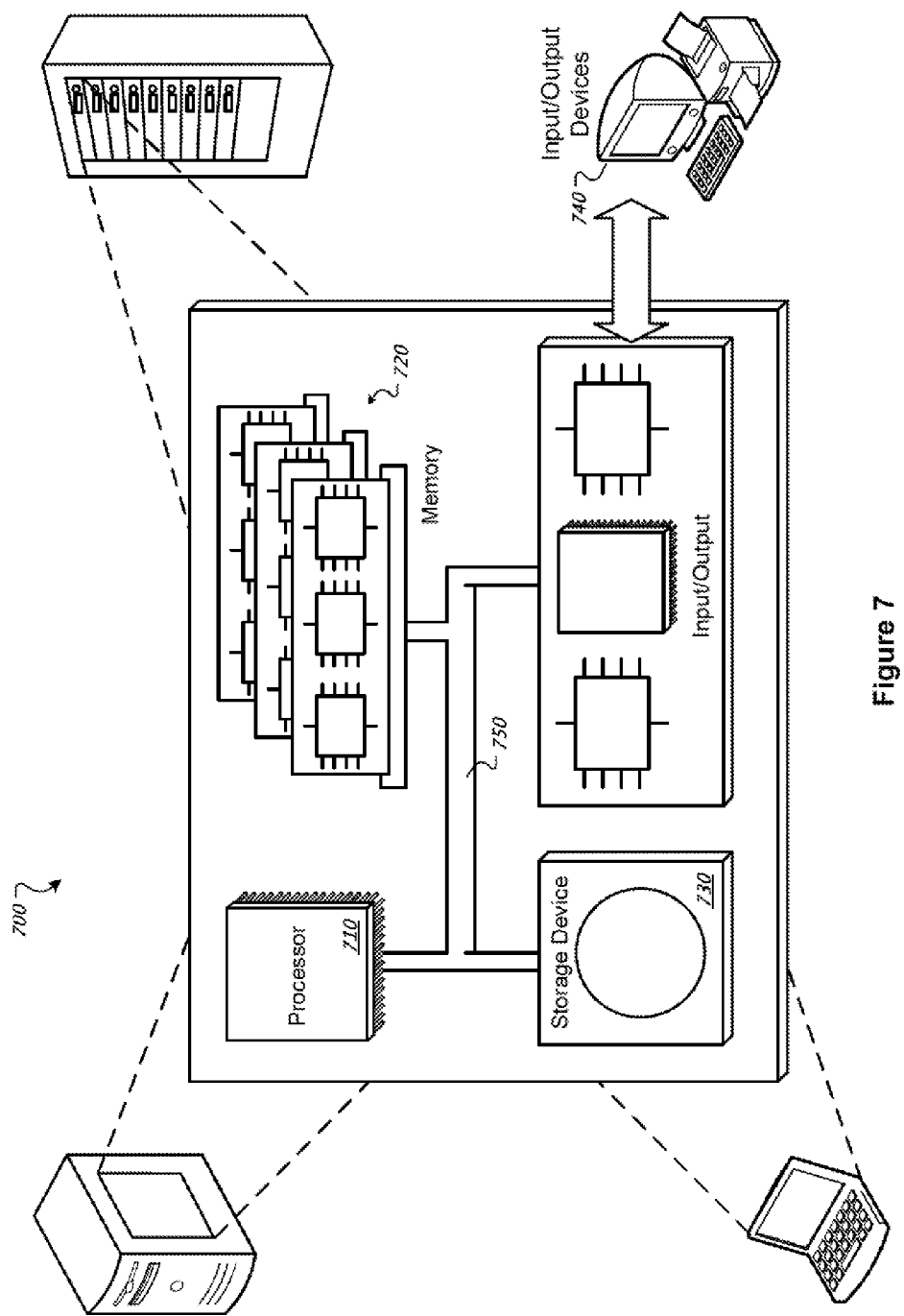
FIG. 7 is a block diagram of a computing system that can be used in connection with computer-implemented methods described in this document.

FIG. 7 is a schematic diagram of a generic computer system 700. The system 700 can be used for the operations described in association with any of the computer-implement methods described previously, according to one implementation. The system 700 includes a processor 710, a memory 720, a storage device 730, and an input/output device 740. Each of the components 710, 720, 730, and 740 are interconnected using a system bus 750. The processor 710 is capable of processing instructions for execution within the system 700. In one implementation, the processor 710 is a single-threaded processor. In another implementation, the processor 710 is a multi-threaded processor. The processor 710 is capable of processing instructions stored in the memory 720 or on the storage device 730 to display graphical information for a user interface on the input/output device 740.

The memory 720 stores information within the system 700. In one implementation, the memory 720 is a computer-readable medium. In one implementation, the memory 720 is a volatile memory unit. In another implementation, the memory 720 is a non-volatile memory unit.

The storage device 730 is capable of providing mass storage for the system 700. In one implementation, the storage device 730 is a computer-readable medium. In various different implementations, the storage device 730 may be a floppy disk device, a hard disk device, an optical disk device, or a tape device.

The input/output device 740 provides input/output operations for the system 700. In one implementation, the input/output device 740 includes a keyboard and/or pointing device. In another implementation, the input/output device 740 includes a display unit for displaying graphical user interfaces.

The features described can be implemented in digital electronic circuitry, or in computer hardware, firmware, software, or in combinations of them. The apparatus can be implemented in a computer program product tangibly embodied in machine-readable storage device for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of embodiments have been described. Nevertheless, it will be understood that various modifications may be made without departing from the spirit and scope of this disclosure. Accordingly, other embodiments are within the scope of the following claims.

What is claimed is:

1. A computer-implemented method for determining content to be displayed, the method comprising:
 determining a first size aspect of first content that is to be presented in a graphical user interface;
 obtaining second content, the second content including (i) text having a text size, and (ii) an image having an image size;
 based on a predefined relationship between a size of the first content and a size of the second content, deciding between adjusting text size or adjusting image size of the second content;
 adjusting, based on the deciding, one of the text size or the image size without adjusting another of the text size or the image size; and
 causing the second content to be presented in the graphical user interface with the first content, wherein, based on the adjustment of the one of the text size or the image size, the second content has a second size aspect with the predefined relationship to the first size aspect.

2. The computer-implemented method of claim 1, wherein the adjustment of the one of the text size or the image size comprises at least one action selected from:
 changing a font size without changing the image size; and
 changing a text layout without changing the image size.

3. The computer-implemented method of claim 1, wherein the second content is of a type that is to be provided in the graphical user interface in an amount so that the second size aspect approximately matches the first size aspect.

4. The computer-implemented method of claim 1, wherein at least the first size aspect is a height, the first size aspect reflecting a vertical height of the first content when the first content is presented in the graphical user interface.

5. The computer-implemented method of claim 1, wherein at least the first size aspect is a width, the first size aspect reflecting a horizontal width of the first content when the first content is presented in the graphical user interface.

6. The computer-implemented method of claim 1, wherein determining the first size aspect comprises determining a first height and width, and wherein the second content is adjusted to have a second height and width that have the predefined relationship to the first height and width.

7. The computer-implemented method of claim 6, wherein the second content is a rectangular advertisement block positioned inside the first content.

8. The computer-implemented method of claim 1, wherein the second content is adjusted so that it matches an identified region of the graphical user interface.

9. The computer-implemented method of claim 8, wherein the second content is adjusted to have a shape selected from the group consisting of square, rectangular, diamond-shape, circular, oval, and combinations thereof.

10. The computer-implemented method of claim 1, wherein determining the first size aspect comprises estimating an aspect that the first content would have if the first content were presented in the graphical user interface.

11. The computer-implemented method of claim 1, wherein determining the first size aspect comprises determining an aspect that the first content has when the first content is presented in the graphical user interface.

12. The computer-implemented method of claim 11, wherein the aspect of the first content is measured with respect to a device on which the first content is presented in the graphical user interface.

13. The computer-implemented method of claim 1, wherein the second content comprises advertisements in multiple units.

14. The computer-implemented method of claim 13, wherein at least one of the multiple units has an individual predefined size that is taken into account in obtaining the second content so that it has the second size aspect.

15. The computer-implemented method of claim 1, wherein the first content while being presented has an actual first size aspect different from the determined first size aspect, further comprising performing an adjustment of at least one of the text size or the image size to set an actual second size aspect of the second content so that the set actual second size aspect has the predefined relationship to the actual first size aspect.

16. The computer-implemented method of claim 15, wherein the actual first size aspect results from a dynamic resizing of the first content in the graphical user interface.

17. The computer-implemented method of claim 15, wherein setting the actual second size aspect comprises causing more content items to be presented in the graphical user interface together with the second content.

18. A computer program product tangibly embodied in a computer-readable storage device and comprising instructions that when executed by a data processor cause the data processor to perform a method for presenting content, the method comprising:
　determining a first size aspect of first content that is to be presented in a graphical user interface;
　obtaining second content, the second content including (i) text having a text size, and (ii) an image having an image size;
　based on a predefined relationship between a size of the first content and a size of the second content, deciding between adjusting text size or adjusting image size of the second content;
　adjusting, based on the deciding, one of the text size or the image size without adjusting another of the text size or the image size; and
　causing the second content to be presented in the graphical user interface with the first content, wherein, based on the adjustment of the one of the text size or the image size, the second content has a second size aspect with a predefined relationship to the first size aspect.

19. A system comprising:
　a processor; and
　a computer-readable storage device having stored therein instructions that, when executed, cause the processor to generate:
　　a size determining module determining a first size aspect of first content that is to be presented in a graphical user interface;
　　a content module obtaining second content based on the first size aspect, the second content:
　　　including (i) text having a text size, and (ii) an image having an image size; and
　　　having a second size aspect with a predefined relationship to the first size aspect;
　　an adjustment module deciding, based on a predefined relationship between a size of the first content and a size of the second content, between adjusting text size or adjusting image size of the second content, and adjusting, based on the deciding, one of the text size or the image size without adjusting another of the text size or the image size; and
　　a page generating module causing the second content to be presented in the graphical user interface with the first content.

20. The system of claim 19, wherein the second content is of a type that is to be provided in the graphical user interface in an amount so that the second size aspect approximately matches the first size aspect.

21. The system of claim 19, wherein the size determining module estimates an aspect that the first content would have if the first content were presented in the graphical user interface.

22. The system of claim 19, wherein the size determining module determines an aspect that the first content has when the first content is presented in the graphical user interface.

23. The system of claim 22, wherein the aspect of the first content is measured with respect to a device on which the first content is presented in the graphical user interface.

24. The system of claim 19, wherein the second content comprises advertisements in multiple units.

25. The system of claim 24, wherein at least one of the multiple units has an individual predefined size that is taken into account in obtaining the second content so that it has the second size aspect.

26. The computer-implemented method of claim 1, wherein the adjustment of the one of the text size or the image size comprises at least one action selected from:
　scaling the image without changing the text size; and
　cropping the image without changing the text size.

27. The system of claim 19, wherein the adjustment of the one of the text size or the image size by the adjustment module comprises at least one action selected from:
　changing a font size without changing the image size; and
　changing a text layout without changing the image size.

28. The system of claim 19, wherein the adjustment of the one of the text size or the image size by the adjustment module comprises at least one action selected from:
　scaling the image without changing the text size; and
　cropping the image without changing the text size.

* * * * *

UNITED STATES PATENT AND TRADEMARK OFFICE
CERTIFICATE OF CORRECTION

Page 1 of 1

PATENT NO. : 8,577,181 B1
APPLICATION NO. : 13/250015
DATED : November 5, 2013
INVENTOR(S) : Gregory Joseph Badros and Matthew I. Lloyd It is certified that error appears in the above-identified patent and that said Letters Patent is hereby corrected as shown below:

On the Title Page:

Item (56), Column 2, line 1, delete "95/001,071," and insert -- 95/001,073, --, therefor.

Signed and Sealed this
Third Day of June, 2014

Michelle K. Lee
*Deputy Director of the United States Patent and Trademark Office*